United States Patent
Sohn

(10) Patent No.: US 9,703,266 B2
(45) Date of Patent: Jul. 11, 2017

(54) INDEPENDENT FIBER-OPTIC REFERENCE APPARATUSES AND METHODS THEREOF

(71) Applicant: Spectracom Corporation, Rochester, NY (US)

(72) Inventor: David Sohn, Pittsford, NY (US)

(73) Assignee: Spectracom Corporation, Rochester, NY (US)

( * ) Notice: Subject to any disclaimer, the term of this patent is extended or adjusted under 35 U.S.C. 154(b) by 51 days.

(21) Appl. No.: 14/532,620

(22) Filed: Nov. 4, 2014

(65) Prior Publication Data

US 2016/0127036 A1    May 5, 2016

(51) Int. Cl.
*H04B 10/079*    (2013.01)
*G04F 5/00*    (2006.01)

(52) U.S. Cl.
CPC ........... *G04F 5/00* (2013.01); *H04B 10/0795* (2013.01)

(58) Field of Classification Search
CPC ........... H04B 10/0795; H04Q 11/0066; H04Q 2011/0083; H04Q 398/154–398/155; G04F 5/00
See application file for complete search history.

(56) References Cited

U.S. PATENT DOCUMENTS

| | | |
|---|---|---|
| 4,297,656 A | 10/1981 | Pan |
| 5,204,640 A | 4/1993 | Logan, Jr. |
| 6,363,036 B1 | 3/2002 | Siepmann |
| 6,853,479 B1 | 2/2005 | Ilchenko et al. |
| 6,879,752 B1 | 4/2005 | Ilchenko et al. |
| 6,928,091 B1 | 8/2005 | Maleki et al. |
| 7,061,335 B2 | 6/2006 | Maleki et al. |
| 7,062,131 B2 | 6/2006 | Ilchenko |
| 7,133,180 B2 | 11/2006 | Ilchenko et al. |
| 7,184,451 B2 | 2/2007 | Ilchenko et al. |

(Continued)

OTHER PUBLICATIONS

Dewaves, "OEwaves to Develop Miniature Battery-Powered Atomic Clocks", Website, 2011, pp. 1-2, Retrieved From: http://www.oewaves.com/, Oct. 13, 2016.

(Continued)

*Primary Examiner* — Leslie Pascal
(74) *Attorney, Agent, or Firm* — LeClairRyan, a Professional Corporation

(57) ABSTRACT

A reference management apparatus includes a reference signal housing, a fixed length propagation device, an oscillator device, and a reference management computing device. The reference signal housing having a propagation signal output and a propagation signal input. The fixed length propagation device is coupled between the propagation signal output and the propagation signal input. The reference signal management computing device is coupled to the oscillator device and the propagation signal input. The reference signal management computing device also comprises at least one of configurable hardware logic configured to implement or a memory coupled to the processor which is configured to be capable of executing programmed instructions comprising and stored in the memory to: detect a start and an end of a transmission of at least one pulse signal through the fixed length propagation device; measure propagation time of the at least one pulse signal through the fixed length propagation device; and utilize the measured propagation time for managing a reference signal.

22 Claims, 6 Drawing Sheets

(56) References Cited

U.S. PATENT DOCUMENTS

| | | |
|---|---|---|
| 7,187,870 B2 | 3/2007 | Ilchenko et al. |
| 7,218,662 B1 | 5/2007 | Ilchenko et al. |
| 7,248,763 B1 | 7/2007 | Kossakovski et al. |
| 7,260,279 B2 | 8/2007 | Gunn et al. |
| 7,283,707 B1 | 10/2007 | Maleki et al. |
| 7,356,214 B2 | 4/2008 | Ilchenko |
| 7,362,927 B1 | 4/2008 | Ilchenko et al. |
| 7,369,722 B2 | 5/2008 | Yilmaz et al. |
| 7,389,053 B1 | 6/2008 | Ilchenko et al. |
| 7,400,796 B1 | 7/2008 | Kossakovski et al. |
| 7,460,746 B2 | 12/2008 | Maleki et al. |
| 7,480,425 B2 | 1/2009 | Gunn et al. |
| 7,587,144 B2 | 9/2009 | Ilchenko et al. |
| 7,634,201 B2 | 12/2009 | Maleki et al. |
| 7,801,189 B2 | 9/2010 | Maleki et al. |
| 7,813,651 B2 | 10/2010 | Ilchenko et al. |
| 7,869,472 B2 | 1/2011 | Maleki et al. |
| 7,929,589 B1 | 4/2011 | Ilchenko et al. |
| 7,965,745 B2 | 6/2011 | Maleki et al. |
| 7,991,025 B2 | 8/2011 | Maleki et al. |
| 8,089,684 B1 | 1/2012 | Koonath et al. |
| 8,094,359 B1 | 1/2012 | Matsko et al. |
| 8,102,597 B1 | 1/2012 | Maleki et al. |
| 8,111,402 B2 | 2/2012 | Le et al. |
| 8,111,722 B1 | 2/2012 | Maleki et al. |
| 8,155,913 B2 | 4/2012 | Eliyahu et al. |
| 8,155,914 B2 | 4/2012 | Eliyahu et al. |
| 8,159,736 B2 | 4/2012 | Maleki et al. |
| 8,289,616 B1 | 10/2012 | Maleki et al. |
| 8,311,376 B1 | 11/2012 | Maleki et al. |
| 8,331,008 B1 | 12/2012 | Matsko et al. |
| 8,331,409 B1 | 12/2012 | Liang et al. |
| 8,417,076 B2 | 4/2013 | Maleki et al. |
| 8,425,139 B2 | 4/2013 | Chan |
| 8,442,088 B1 | 5/2013 | Ilchenko et al. |
| 8,498,539 B1 | 7/2013 | Ilchenko et al. |
| 8,514,400 B2 | 8/2013 | Mohageg et al. |
| 8,538,270 B2 | 9/2013 | Seidel et al. |
| 8,564,869 B1 | 10/2013 | Mohageg et al. |
| 8,565,274 B2 | 10/2013 | Maleki et al. |
| 8,605,760 B2 | 12/2013 | Liang et al. |
| 8,659,814 B2 | 2/2014 | Matsko et al. |
| 8,681,827 B2 | 3/2014 | Maleki et al. |
| 8,761,555 B2 | 6/2014 | Matsko et al. |
| 8,761,603 B1 | 6/2014 | Maleki |
| 8,804,231 B2 | 8/2014 | Savchenkov et al. |
| 8,831,056 B2 | 9/2014 | Savchenkov et al. |
| 2008/0075464 A1 | 3/2008 | Maleki et al. |
| 2009/0324251 A1 | 12/2009 | Ilchenko et al. |
| 2010/0011837 A1 | 1/2010 | Eglseder et al. |
| 2011/0097078 A1 | 4/2011 | Eliyahu et al. |
| 2011/0110387 A1 | 5/2011 | Maleki et al. |
| 2011/0150485 A1 | 6/2011 | Seidel et al. |
| 2011/0255094 A1 | 10/2011 | Mohageg et al. |
| 2012/0039346 A1 | 2/2012 | Liang et al. |
| 2012/0194893 A1 | 8/2012 | Maleki et al. |
| 2012/0195590 A1 | 8/2012 | Eliyahu et al. |
| 2012/0294319 A1 | 11/2012 | Maleki et al. |
| 2012/0327497 A1 | 12/2012 | Matsko et al. |
| 2013/0003766 A1 | 1/2013 | Savchenkov et al. |
| 2013/0258435 A1 | 10/2013 | Matsko et al. |
| 2013/0259072 A1 | 10/2013 | Maleki et al. |
| 2013/0320449 A1 | 12/2013 | Hoentschel et al. |
| 2014/0269791 A1 | 9/2014 | Liang et al. |
| 2014/0321485 A1 | 10/2014 | Seidel et al. |

OTHER PUBLICATIONS

M. Bousonville, "New Phase Stable Optical Fiber", MOPG033, 2012, pp. 101-103.

INDEPENDENT FIBER-OPTIC REFERENCE APPARATUSES AND METHODS THEREOF

FIELD

This technology generally relates to signal reference devices and methods and, more particularly, to independent fiber-optic reference apparatuses and methods thereof.

BACKGROUND

Time and frequency references are used in a variety of different applications to keep devices and systems, such as master clocks, reference clocks, time standard clocks, network clocks, authoritative time sources, sync clocks, and atomic clocks by way of example, running consistently and on-time. To maintain this precision, some of these time and frequency references use global positioning systems (GPS) and other precision time sources.

Unfortunately, many of these time and frequency references are susceptible to outside influence which can have a negative impact on maintaining precise performance. Additionally, these time and frequency references rely on system oscillators, whether crystal or atomic based, which are critical to maintaining precise performance. These oscillators are subject to natural degradation, reducing precision when not steered to a time and frequency reference, and are subject to failure conditions that can be difficult to detect normally.

SUMMARY

A reference management apparatus includes a reference signal housing, a fixed length propagation device, an oscillator device, and a reference signal management computing device. The reference signal housing having a propagation signal output and a propagation signal input. The fixed length propagation device is coupled between the propagation signal output and the propagation signal input. The reference signal management computing device is coupled to the oscillator device and the propagation signal input. The reference signal management computing device also comprises at least one of configurable hardware logic configured to implement or a memory coupled to the processor which is configured to be capable of executing programmed instructions comprising and stored in the memory to: detect a start and an end of a transmission of at least one pulse signal through the fixed length propagation device; measure propagation time of the at least one pulse signal through the fixed length propagation device; and utilize the measured propagation time for managing a reference signal.

A method for making a reference management apparatus includes providing a reference signal housing having a propagation signal output and a propagation signal input. A fixed length propagation device is coupled between the propagation signal output and the propagation signal input. A reference signal management computing device is coupled to an oscillator device and the propagation signal input. The reference signal management computing device comprises at least one of configurable hardware logic configured to implement or a memory coupled to the processor which is configured to be capable of executing programmed instructions comprising and stored in the memory to: detect a start and an end of a transmission of at least one pulse signal through the fixed length propagation device; measure propagation time of the at least one pulse signal through the fixed length propagation device; and utilize the measured propagation time for managing a reference signal.

This technology provides a number of advantages including providing a reliable backup reference apparatus for assisting in maintaining precise timing performance. Additionally, this backup reference apparatus is able to operate independently without being affected by outside influences to qualify other references and modules of reference systems and devices. Further, this technology can be easily and relatively inexpensively added into existing reference systems and devices. Even further, this technology can be applied similarly to manage and/or control steered and unsteered oscillator devices.

DETAILED DESCRIPTION

Figure 1:
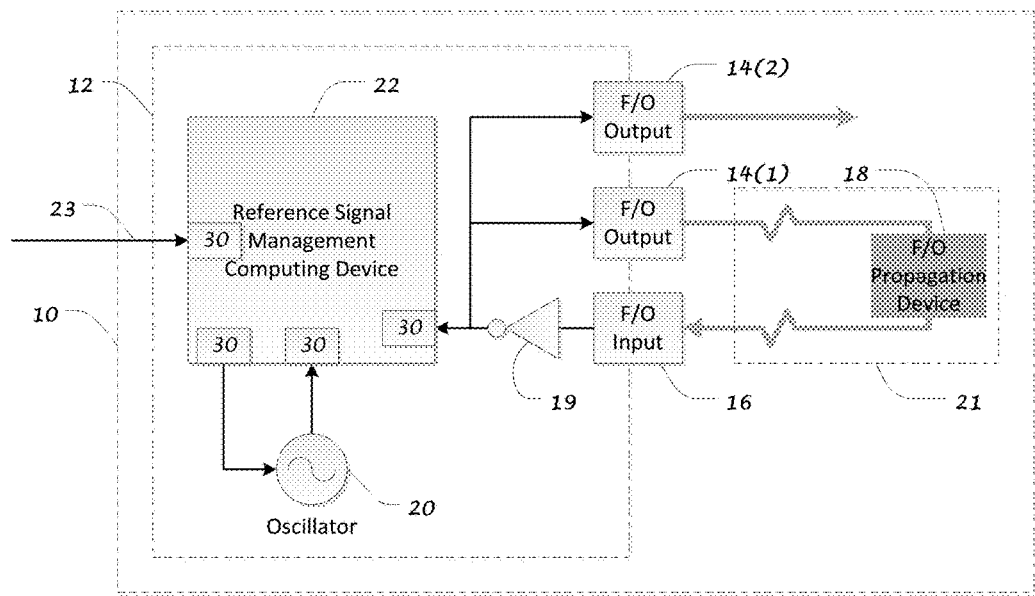
FIG. 1 is a block diagram of an environment with an example of a fiber-optic reference apparatus.
Figure 2:
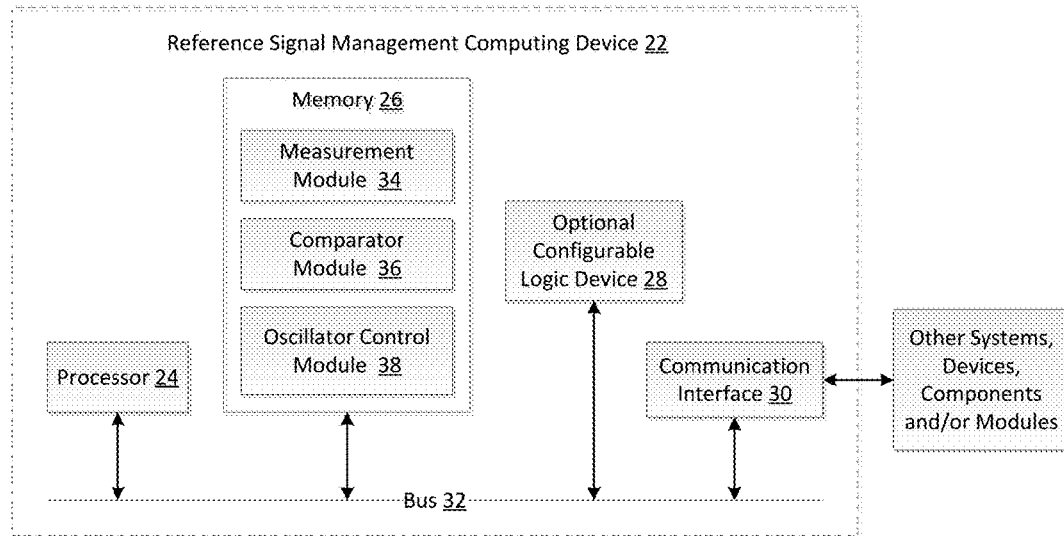
FIG. 2 is a block diagram of the reference signal management computing device.

An example of an independent fiber-optic reference apparatus 10 is illustrated in FIGS. 1 and 2. The independent fiber-optic reference apparatus 10 includes a reference signal housing 12 with a signal inverting device 19, an oscillator device 20, and a reference signal management computing device 22 and a fixed length fiber optic propagation device 18 in an optional temperature controlled propagation device housing 21, although the independent fiber-optic reference apparatus 10 can include other types and numbers of systems, devices, components, and/or other elements and in other topologies and deployments. This technology provides a number of advantages including providing a reliable backup reference apparatus for assisting in maintaining precise timing performance.

Referring more specifically to FIG. 1, in this particular example the optional reference signal housing 12 includes the signal inverting device 19, the oscillator device 20, and the reference signal management computing device 22, although other types and/or numbers of systems, devices, components and/or other elements could be housed in or outside of the optional reference signal housing 12. Additionally, in this example the optional reference signal housing 19 includes propagation signal outputs (also labelled in this example as fiber optic (F/O) outputs) 14(1)-14(2), a propagation signal input (also labelled in this example as fiber optic (F/O) input) 16, and a reference signal input 23, although the reference signal housing 12 could have other types and/or numbers of other inputs and/or outputs.

The signal inverting device 19 has an input coupled to the propagation signal input 16, and an output coupled to each of the propagation signal outputs 14(1) and 14(2) and the reference signal management computing device 22, although the signal inverting device 19 could be coupled to other types and/or numbers of other systems, device, components, elements, inputs and/or outputs in other manners. The signal inverting device 19 inverts the pulse signal received from the propagation signal input 16 to each of the propagation signal outputs 14(1) and 14(2), although the signal inverting device 19 could be coupled to other types and/or fewer or greater numbers of systems, devices, components, and/or other elements. In this example, the optional propagation signal output 14(2) is used to provide the pulse signal to other apparatuses for generating an independent backup reference signal.

The oscillator device 20 comprises an oscillator that provides the timebase for measurements as illustrated and described with the examples herein. A variety of different types and/or numbers of oscillator devices could be used.

Referring to FIGS. 1 and 2, the reference signal management computing device 22 assists with measuring and processing signal propagation time through the fixed length of fiber optical propagation device 18 and of a frequency of an incoming reference signal via a reference signal input 23 to maintain steering of the oscillator device 20 as illustrated and described with the examples herein, although reference signal management computing device 22 may perform other types and/or numbers of other functions. As illustrated in FIG. 2, the reference signal management computing device 22 includes a processor 24, memory 26, optional configurable logic device 28, and a communication interface 30 which are coupled together by bus 32, although reference signal management computing device 22 may comprise other types and numbers of modules in other configurations.

The processor 24 may be configured to be capable of executing one or more non-transitory programmed computer-executable instructions stored in the memory 26 for the methods illustrated and described with reference to the examples herein, although the processor can execute other types and numbers of instructions and perform other types and numbers of operations. The memory 26 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art.

Figure 3:
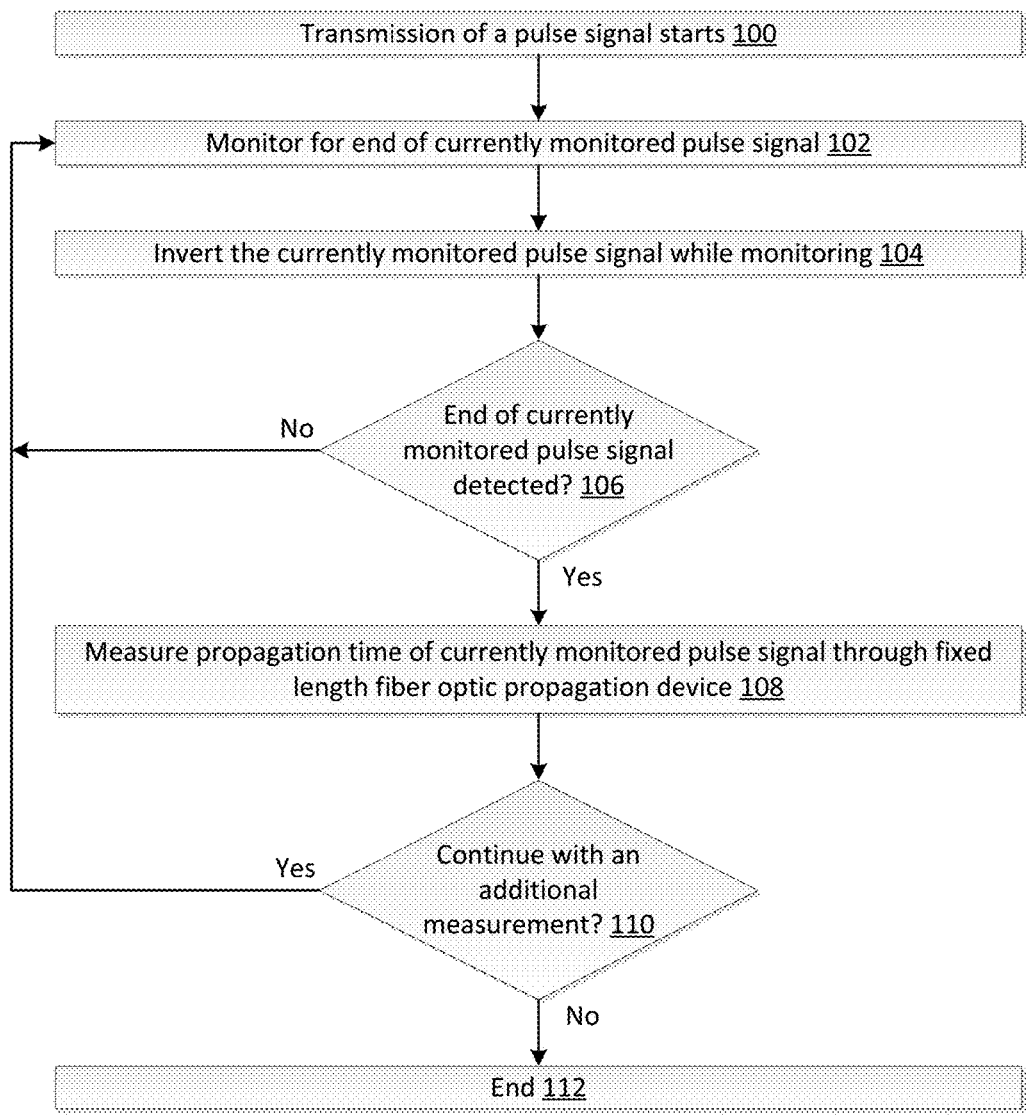
FIG. 3 is a flowchart of an example of a method for generating calibration data which can be stored and used as an independent backup reference signal.
Figure 4:
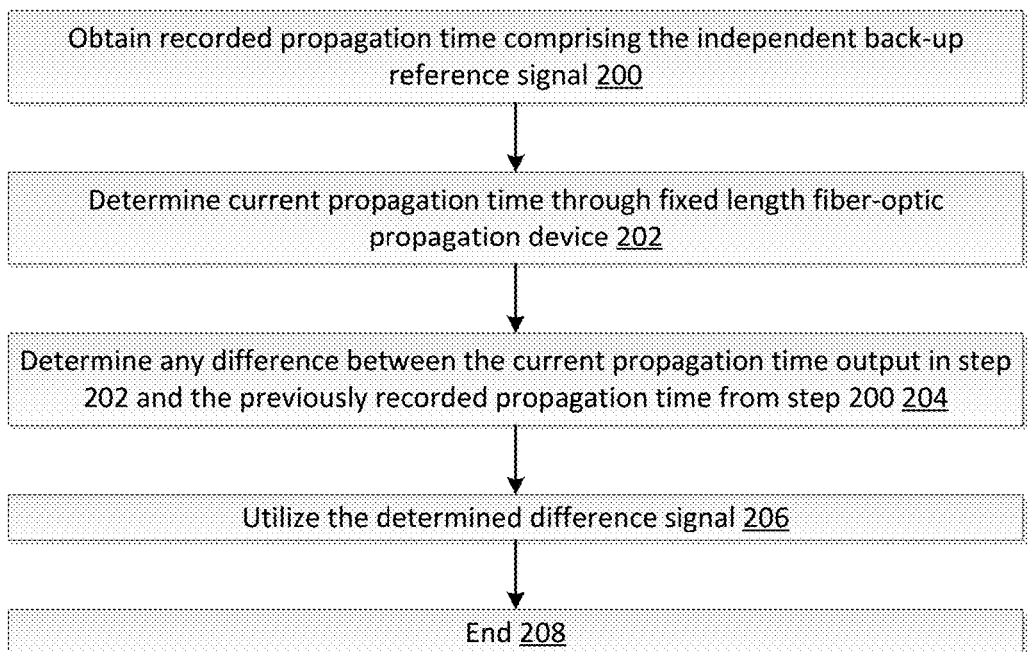
FIG. 4 is a flowchart of a method for using the generated independent reference signal.
Figure 5:
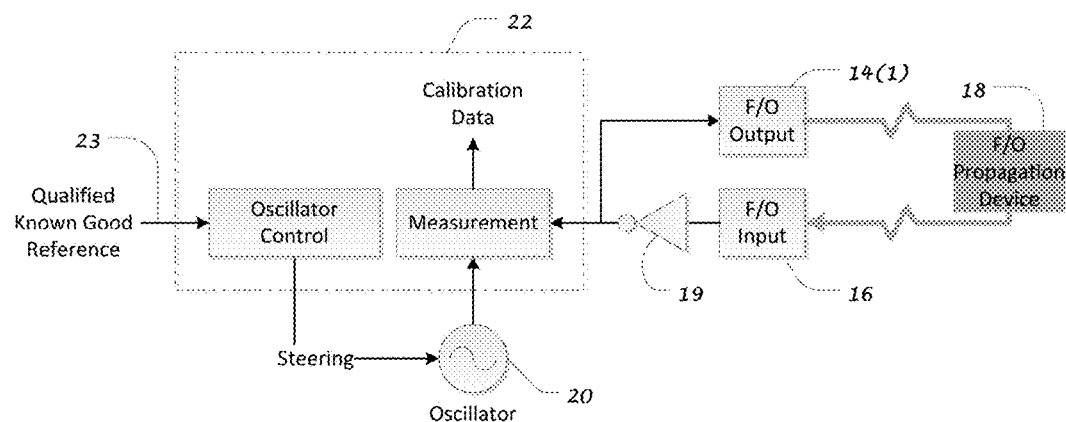
FIG. 5 is a functional block diagram of the method for generating calibration data which can be stored and used as the independent backup reference signal.
Figure 6:
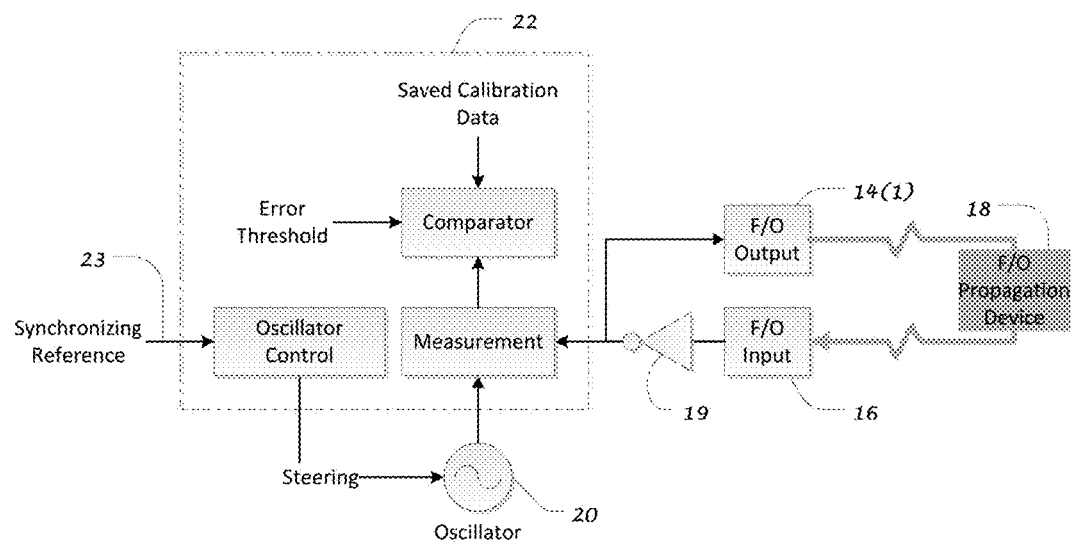
FIG. 6 is a functional block diagram of a first example of the method for using the generated independent reference signal.
Figure 7:
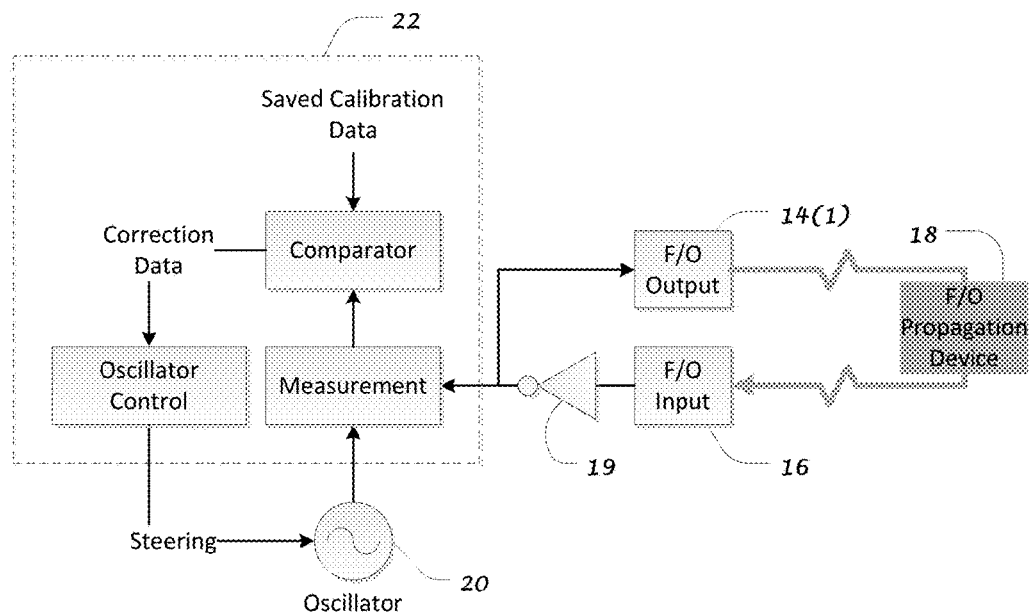
FIG. 7 is a functional block diagram of a second example of the method for using the generated independent reference signal.
Figure 8:
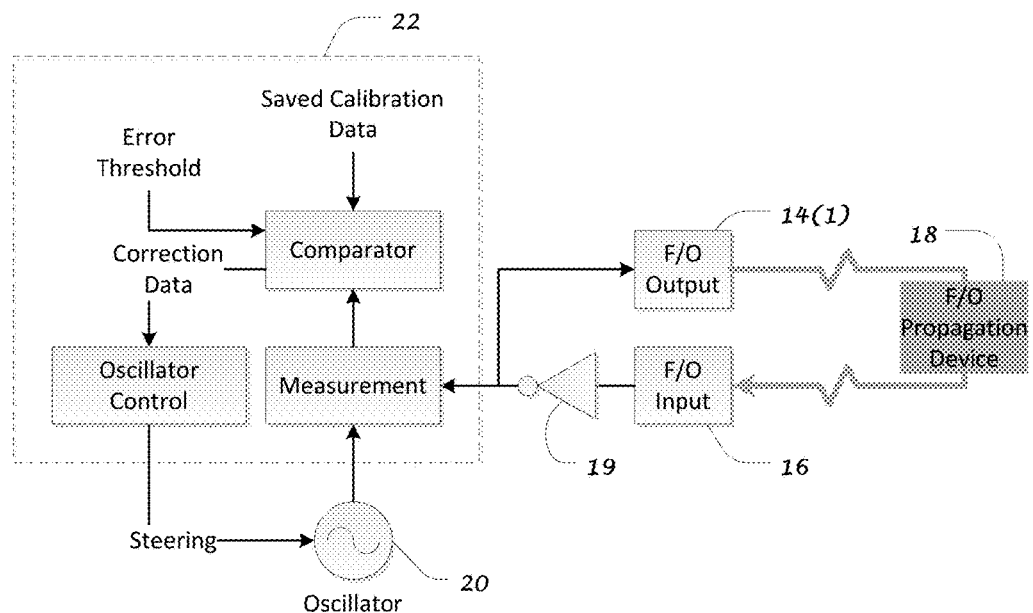
FIG. 8 is a functional block diagram of a third example of the method for using the generated independent reference signal.
Figure 9:
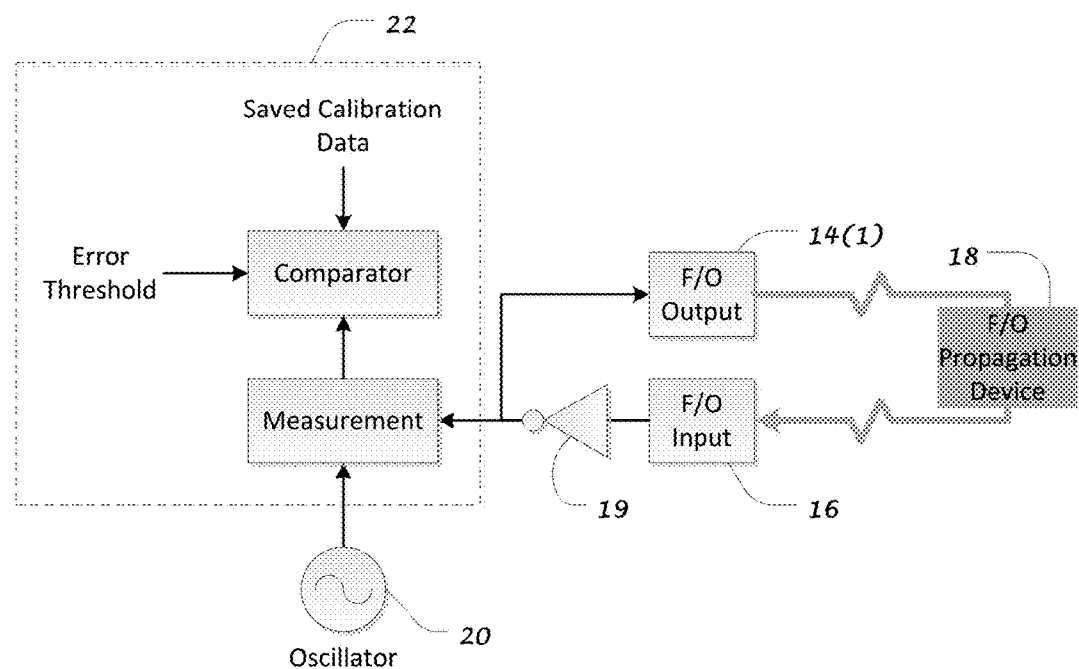
FIG. 9 is a functional block diagram of a fourth example of the method for using the generated independent reference signal.

The memory 26 may store one or more non-transitory computer-readable instructions of this technology as illustrated and described with reference to the examples herein that may be executed by the at least one processor 24. The flowcharts shown in FIGS. 3 and 4 and the functional block diagrams FIGS. 5-8 are representative of examples of steps or actions of this technology that may be embodied or expressed as one or more non-transitory computer or machine readable instructions stored in memory 26 that may be executed by the at least one processor 24 and/or may be implemented by configured logic in the optional configurable logic device 28.

In this example, the memory 26 includes a measurement module 34, comparator module 36, and oscillator control module 38, although the memory 26 could include other types and/or numbers of other programmed instructions and/or modules. The measurement module 34 comprises programmed instructions to monitor for and detect receipt of the pulse signal and records the propagation time of any pulse signals, although this module could comprise other types and/or numbers of programmed instructions with other functions. The comparator module 36 comprises programmed instructions to execute various comparisons as illustrated and described with the examples herein, such as of the independent backup reference signal against a qualified known good reference signal or against a synchronizing reference signal by way of example only, although this module could comprise other types and/or numbers of programmed instructions with other functions. The oscillator control module 38 comprises programmed instructions to steer or otherwise control or adjust the operation of the oscillator device 20 in response to measurements and/or comparisons as illustrated and described with the examples herein, although this module could comprise other types and/or numbers of programmed instructions with other functions.

The optional configurable logic device 28 may comprise specialized hardware configured to implement one or more steps of this technology as illustrated and described with reference to the examples herein. By way of example only, the optional configurable logic device 28 may comprise one or more of field programmable gate arrays ("FPGAs"), field programmable logic devices ("FPLDs"), application specific integrated circuits (ASICs") and/or programmable logic units ("PLUs"). The communication interface 30 in the reference signal management computing device 22 is used to operatively couple and communicate between the reference signal management computing device 22 and other systems, devices, components, and/or modules.

Although an example of the reference signal management computing device 22 is described and illustrated herein, other types and numbers of systems, devices, components, and/or modules in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

The fixed length fiber optic propagation device 18 is coupled at one end to one of the propagation signal output 14(1) and at the other end to the propagation signal input 16, although the fixed length fiber optic propagation device 18 could be coupled in other manners. In this particular example, the fixed length fiber optic propagation device 18 is a single mode fiber optic cable with a 1 km length, although other types of fixed length propagation devices with other lengths could be used. By way of example only, the fixed length fiber optic propagation device 18 could also be a multimode fiber optic cable. Additionally, in this particular example the fixed length of fiber optical cable in fiber optic propagation device 18 has a thermal coefficient of delay at or below 5 ps/km/K, although fiber optic cables with other thermal coefficients of delay could be used. Further, in this particular example the fixed length of fiber optic cable in fiber optic propagation device 18 may have an optional temperature controlled housing 21 that encloses the cable to minimize any possible outside influence on the fixed propagation of the pulse signal, although other types of housings or other manners for controlling any impact from temperature changes could be used.

An example of a method for generating calibration data which can be stored and used as an independent backup reference signal will now be described herein with reference to FIGS. 1-3 and 5. A known qualified good reference signal is received via the reference signal input 23 and is required for reference signal management computing device 22 to steer oscillator device 20 for precise measurements in this example.

In step 100, transmission of a pulse signal to each of the propagation signal outputs 14(1) and 14(2) starts, although the pulse signal could be transmitted to other types and/or fewer or greater numbers of systems, devices, components, and/or other elements.

In step 102, the reference signal management computing device 22 monitors at the propagation signal input 16 for an end of the currently transmitted pulse signal which has passed through the fixed length fiber optic propagation device 18.

In step 104, the inverting device 19 inverts the currently monitored pulse signal received at the propagation signal input 16 while the reference signal management computing device 22 is monitoring for the end of the currently transmitted pulse signal. This inverted pulse signal is fed back from the inverting device 19 to the each of the propagation signal outputs 14(1) and 14(2) for the next measurement, although the inverted pulse signal could be transmitted to other types and/or fewer or greater numbers of systems, devices, components, and/or other elements.

In step 106, the reference signal management computing device 22 determines if the end of the currently transmitted pulse signal is detected. If in step 106, the reference signal management computing device 22 determines the end of the currently transmitted pulse signal is not detected, then the No branch is taken back to step 102 as described earlier. If in step 106, the reference signal management computing device 22 determines the end of the currently transmitted pulse signal is detected, then the Yes branch to step 108.

In step 108, the reference signal management computing device 22 measures the propagation time of the currently monitored pulse signal through the fixed length fiber optic propagation device 18 based on the monitoring and using the qualified known good reference signal received via the reference signal input 23. In this particular example, the reference signal management computing device 22 stores the measured propagation time as calibration data which can be used as an independent backup reference signal, although the reference signal management computing device could use the independent backup reference signal in other manners as illustrated and described in additional examples described herein.

In step 110, the reference signal management computing device 22 determines whether to continue to take an additional measurement of a transmission signal through the fixed length fiber optic propagation device 18. By way of example only, the reference signal management computing device 22 may make several measurements of the propagation time and then use the average of those measurements, although this method could use a single propagation time or could process the multiple measurements of the propagation time in other manners.

If in step 110, the reference signal management computing device 22 makes a determination to continue to take an additional measurement, then the Yes branch is taken to step 102 as described earlier. If in step 110, the reference signal management computing device 22 determines not to continue to take any additional measurements, then the No branch is taken to step 112 where this example of the method ends.

A first example of a method for using an independent backup reference signal will now be described herein with reference to FIGS. 1, 2, 4 and 6. In this particular example, a received synchronizing reference signal is being qualified. The synchronizing reference signal being qualified is required to be in use by the reference signal management computing device 22 to steer oscillator device 20 for measurements in this example.

In step 200, the reference signal management computing device 22 obtains the recorded propagation time that comprises the stored independent back-up reference signal which was determined using the method as described and illustrated with reference to FIGS. 1-3 and 5 above.

In step 202, the reference signal management computing device 22 determines a current propagation time through fixed length fiber optic propagation device 18 using the method as described and illustrated with reference to FIGS. 1-3 and 5 above which is based on the timebase provided by oscillator device 20. Again in this example the oscillator device 20 is steered by the synchronizing reference signal received via the reference signal input 23.

In step 204, the reference signal management computing device 22 determines any difference between the current propagation time output in step 202 and the previously recorded propagation time from step 200. Any deviation is an indication of an error with the synchronizing reference signal received via the reference signal input 23 because that received synchronizing reference signal is used by oscillator control module 38 to steer oscillator device 20, which is the timebase for the current measurement.

In step 206, the reference signal management computing device 22 utilizes the determined difference signal by determining if the difference is above a stored error threshold in the reference signal management computing device 22 and outputting information about a quality of the synchronizing reference signal based on the determination, although other manners or approaches for utilizing the determined quality could be used. In step 208, this example of the method ends.

A second example of a method for using an independent backup reference signal will now be described herein with reference to FIGS. 1, 2, 4 and 7. In this particular example, this method is used to generate correction data used by oscillator control module 38 in the reference signal management computing device 22 to steer oscillator device 20.

In step 200, the reference signal management computing device 22 obtains the recorded propagation time that comprises the stored independent back-up reference signal which was determined using the method as described and illustrated with reference to FIGS. 1-3 and 5 above.

In step 202, the reference signal management computing device 22 determines a current propagation time through fixed length fiber optic propagation device 18 using the method as described and illustrated with reference to FIGS. 1-3 and 5 above which is based on the timebase provided by the oscillator device 20.

In step 204, the reference signal management computing device 22 determines any difference between the current propagation time output in step 202 and the previously recorded propagation time from step 200. Any deviation is an indication of a deviation with the oscillator device 20 which is the timebase for the current measurement.

In step 206, the reference signal management computing device 22 utilizes the determined difference signal, also referred to as correction data in this example, in the oscillator control module 38 to provide a steering signal to the oscillator device 20 to minimize and/or eliminate the deviation, although other manners or approaches for utilizing the determined difference could be used. In step 208, this example of the method ends.

A third example of a method for using an independent backup reference signal will now be described herein with reference to FIGS. 1, 2, 4 and 8. In this particular example, the oscillator device 20 is being qualified and is being steered using the method as described and illustrated with reference to FIGS. 1, 2, 4 and 7 above.

In step 200, the reference signal management computing device 22 obtains the recorded propagation time that comprises the stored independent back-up reference signal which was determined using the method as described and illustrated with reference to FIGS. 1-3 and 5 above.

In step 202, the reference signal management computing device 22 determines a current propagation time through fixed length fiber optic propagation device 18 using the method as described and illustrated with reference to FIGS. 1-3 and 5 above which is based on the timebase provided by the oscillator device 20.

In step 204, the reference signal management computing device 22 determines any difference between the current propagation time output in step 202 and the previously recorded propagation time from step 200. Any deviation is an indication of a deviation with the oscillator device 20 which is the timebase for the current measurement.

In step 206, the reference signal management computing device 22 utilizes the determined difference signal, also referred to as correction data in this example, to determine if the correction data change from the previous measurement is above a stored error threshold in the reference signal management computing device 22 and outputting the information about the quality of oscillator device 20, although other manners or approaches for utilizing the determined quality could be used. By way of example only, the reference signal management computing device 22 may make several measurements of the determined correction data and then use the average of those measurements when determining if the stored error threshold is exceeded, although this method could use a single measurement or could process the multiple measurements of the correction data change in other manners. In step 208, this example of the method ends.

In another example, the reference signal management computing device 22 may in step 200 detect and measure at least one reference propagation time and in step 202 detect and measure a plurality of current propagation times. Next, in step 204 the reference signal management computing device 22 may determine a difference between the reference propagation time and each of the plurality of the current propagation times. Next, in step 206 the reference signal management computing device 22 may utilize the determined differences by determining when a rate of change of the determined differences between the reference propagation time and each of the plurality of the current propagation times is above a stored rate of change threshold. The reference signal management computing device 22 may then output an indication of an error in the steering mode of the oscillator device 20 when the rate of change of the determined differences is determined to be above the stored rate of change threshold. In step 208, this example of the method ends.

A fourth example of a method for using an independent backup reference signal will now be described herein with reference to FIGS. 1, 2, 4 and 9. In this particular example, the oscillator device 20 is being qualified and is in a free-running mode.

In step 200, the reference signal management computing device 22 obtains the recorded propagation time that comprises the stored independent back-up reference signal which was determined using the method as described and illustrated with reference to FIGS. 1-3 and 5 above.

In step 202, the reference signal management computing device 22 determines a current propagation time through fixed length fiber optic propagation device 18 using the method as described and illustrated with reference to FIGS. 1-3 and 5 above which is based on the timebase provided by the oscillator device 20.

In step 204, the reference signal management computing device 22 determines any difference between the current propagation time output in step 202 and the previously recorded propagation time from step 200. Any deviation is an indication of a deviation with the oscillator device 20 which is the timebase for the current measurement.

In step 206, the reference signal management computing device 22 utilizes the determined difference signal to determine if the propagation time change from the previous measurement is above a stored error threshold in the reference signal management computing device 22 and outputs the information about the quality of oscillator device 20, although other manners or approaches for utilizing the determined quality could be used. By way of example only, the reference signal management computing device 22 may make several measurements of the propagation time and then use the average of those measurements when determining if the stored error threshold is exceeded, although this method could use a single measurement or could process the multiple measurements of the propagation time in other manners. In step 208, this example of the method ends.

In another example, the reference signal management computing device 22 may in step 200 detect and measure at least one reference propagation time and in step 202 detect and measure a plurality of current propagation times. Next, in step 204 the reference signal management computing device 22 may determine a difference between the reference propagation time and each of the plurality of the current propagation times. Next, in step 206 the reference signal management computing device 22 may utilize the determined differences by determining when a rate of change of the determined differences between the reference propagation time and each of the plurality of the current propagation times is above a stored rate of change threshold. The reference signal management computing device 22 may then output an indication of an error in the oscillator device in a free running mode when the rate of change of the determined differences is determined to be above the stored rate of change threshold. In step 208, this example of the method ends.

Accordingly, as illustrated and described with the examples herein, this technology provides a reliable backup reference apparatus for assisting in maintaining precise timing performance. Additionally, this backup reference apparatus is able to operate independently without being affected by outside influences. Further, this technology can be easily and relatively inexpensively added into existing reference systems and devices. Even further, this technology can be applied similarly to manage and/or control steered and unsteered oscillator devices.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing modules or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A reference management apparatus, the apparatus comprising:
    a reference signal housing having a propagation signal output and a propagation signal input;
    a fixed length propagation device coupled between the propagation signal output and the propagation signal input;
    an oscillator device; and
    a reference signal management computing device coupled to the oscillator device and the propagation signal input, the reference signal management computing device comprising at least one of configurable hardware logic configured to implement or a memory coupled to a processor which is configured to be capable of executing programmed instructions comprising and stored in the memory to:
        transmit at least one pulse signal through the fixed length propagation device;
        detect a start and an end of a transmission of the at least one pulse signal through the fixed length propagation device;
        measure a reference propagation time of the at least one pulse signal through the fixed length propagation device based on the detected start and end of the transmission of the at least one pulse signal through the fixed length propagation device with a time base provided by the oscillator device steered by a qualified known good reference signal; and
        store the measured reference propagation time as calibration data.

2. The apparatus as set forth in claim 1 further comprising an inverter device configured to invert the pulse signal and coupled between the propagation signal output and the propagation signal input.

3. The apparatus as set forth in claim 1 wherein the fixed length propagation device comprises a fixed length of fiber optic cable.

4. The apparatus as set forth in claim 3 wherein the fiber optic cable is a multimode fiber optic cable.

5. The apparatus as set forth in claim 3 wherein the fiber optic cable is a single mode fiber optic cable.

6. The apparatus as set forth in claim 3 wherein the fixed length of fiber optical cable has a thermal coefficient of delay at or below 5 ps/km/K.

7. The apparatus as set forth in claim 1 further comprising a temperature controlled housing that encloses at least a portion of the fixed length propagation device.

8. The apparatus as set forth in claim 1 further comprising the at least one of configurable hardware logic being further configured to implement or the memory coupled to the processor being further configured to be capable of executing programmed instructions comprising and stored in the memory to:
    transmit another pulse signal through the fixed length propagation device;
    detect a start and an end of a transmission of the another pulse signal through the fixed length propagation device;
    measure a current propagation time of the another pulse signal based on the detected start and end of the transmission of the another pulse signal through the fixed length propagation device with a time base provided by the oscillator device and steered by a synchronizing reference signal;
    determine a difference between the reference propagation time and the current propagation time that indicates an error in the synchronizing reference signal;
    determine when the determined difference is above a stored error threshold; and
    output information about the synchronizing reference signal based on the determination of when the determined difference is above a stored error threshold.

9. The apparatus as set forth in claim 1 further comprising the at least one of configurable hardware logic being further configured to implement or the memory coupled to the processor being further configured to be capable of executing programmed instructions comprising and stored in the memory to:
    transmit another pulse signal through the fixed length propagation device;
    detect a start and an end of a transmission of the another pulse signal through the fixed length propagation device;
    measure a current propagation time of the another pulse signal based on the detected start and end of the transmission of the another pulse signal through the fixed length propagation device with a time base provided by the oscillator device;
    determine a deviation between the reference propagation time and the current propagation time; and
    use the determined deviation to steer the oscillator device towards correcting the determined deviation.

10. The apparatus as set forth in claim 1 further comprising the at least one of configurable hardware logic being further configured to implement or the memory coupled to the processor being further configured to be capable of executing programmed instructions comprising and stored in the memory to:

transmit other pulse signals through the fixed length propagation device;

detect a start and an end of a transmission of each of the other pulse signals through the fixed length propagation device;

measure a plurality of current propagation times of each of the other pulse signals based on the detected start and end of the transmission of each of the other pulse signals through the fixed length propagation device with a time base provided by the oscillator device;

determine a deviation between the reference propagation time and each of the plurality of the current propagation times;

determine when a rate of change of the determined deviations is above a stored rate of change threshold; and output an indication of an error in the oscillator device in a steered mode when the rate of change of the determined differences is determined to be above the stored rate of change threshold.

11. The apparatus as set forth in claim 1 further comprising the at least one of configurable hardware logic being further configured to implement or the memory coupled to the processor being further configured to be capable of executing programmed instructions comprising and stored in the memory to:

transmit other pulse signals through the fixed length propagation device;

detect a start and an end of a transmission of each of the other pulse signals through the fixed length propagation device;

measure a plurality of current propagation times of each of the other pulse signals based on the detected start and end of the transmission of each of the other pulse signals through the fixed length propagation device with a time base provided by the oscillator device;

determine a difference between the reference propagation time and each of the plurality of the current propagation times;

determine when a rate of change of the determined differences between the reference propagation time and each of the plurality of the current propagation times is above a stored rate of change threshold; and output an indication of an error in the oscillator device in a free running mode when the rate of change of the determined differences is determined to be above the stored rate of change threshold.

12. A method for making a reference management apparatus, the method comprising:

providing a reference signal housing having a propagation signal output and a propagation signal input;

coupling a fixed length propagation device between the propagation signal output and the propagation signal input; and coupling a reference signal management computing device to an oscillator device and the propagation signal input, the reference signal management computing device comprising at least one of configurable hardware logic configured to implement or a memory coupled to a processor which is configured to be capable of executing programmed instructions comprising and stored in the memory to:

transmit at least one pulse signal through the fixed length propagation device;

detect a start and an end of a transmission of the at least one pulse signal through the fixed length propagation device;

measure a reference propagation time of the at least one pulse signal through the fixed length propagation device based on the detected start and end of the transmission of the at least one pulse signal through the fixed length propagation device with a time base provided by the oscillator device steered by a qualified known good reference signal; and store the measured reference propagation time as calibration data.

13. The method as set forth in claim 12 further comprising coupling an inverter device between the propagation signal output and the propagation signal input, the inverter device configured to invert the pulse signal.

14. The method as set forth in claim 12 wherein the fixed length propagation device comprises a fixed length of fiber optic cable.

15. The method as set forth in claim 14 wherein the fiber optic cable is a multimode fiber optic cable.

16. The method as set forth in claim 14 wherein the fiber optic cable is a single mode fiber optic cable.

17. The method as set forth in claim 14 wherein the fixed length of fiber optical cable has a thermal coefficient of delay at or below 5 ps/km/K.

18. The method as set forth in claim 12 further comprising enclosing at least a portion of the fixed length propagation device with a temperature controlled housing.

19. The method as set forth in claim 12 further comprising the at least one of configurable hardware logic being further configured to implement or the memory coupled to the processor being further configured to be capable of executing programmed instructions comprising and stored in the memory to:

transmit another pulse signal through the fixed length propagation device;

detect a start and an end of a transmission of the another pulse signal through the fixed length propagation device;

measure a current propagation time of the another pulse signal based on the detected start and end of the transmission of the another pulse signal through the fixed length propagation device with a time base provided by the oscillator device and steered by a synchronizing reference signal;

determine a difference between the reference propagation time and the current propagation time that indicates an error in the synchronizing reference signal;

determine when the determined difference is above a stored error threshold; and output information about the synchronizing reference signal based on the determination of when the determined difference is above a stored error threshold.

20. The method as set forth in claim 12 further comprising the at least one of configurable hardware logic being further configured to implement or the memory coupled to the processor being further configured to be capable of executing programmed instructions comprising and stored in the memory to:

transmit another pulse signal through the fixed length propagation device;

detect a start and an end of a transmission of the another pulse signal through the fixed length propagation device;

measure a current propagation time of the another pulse signal based on the detected start and end of the transmission of the another pulse signal through the fixed length propagation device with a time base provided by the oscillator device;

determine a deviation between the reference propagation time and the current propagation time; and use the determined deviation to steer the oscillator device towards correcting the determined deviation.

21. The method as set forth in claim 12 further comprising the at least one of configurable hardware logic being further configured to implement or the memory coupled to the processor being further configured to be capable of executing programmed instructions comprising and stored in the memory to:

transmit other pulse signals through the fixed length propagation device;

detect a start and an end of a transmission of each of the other pulse signals through the fixed length propagation device;

measure a plurality of current propagation times of each of the other pulse signals based on the detected start and end of the transmission of each of the other pulse signals through the fixed length propagation device with a time base provided by the oscillator device;

determine a deviation between the reference propagation time and each of the plurality of the current propagation times;

determine when a rate of change of the determined deviations is above a stored rate of change threshold; and output an indication of an error in the oscillator device in a steered mode when the rate of change of the determined differences is determined to be above the stored rate of change threshold.

22. The method as set forth in claim 12 further comprising the at least one of configurable hardware logic being further configured to implement or the memory coupled to the processor being further configured to be capable of executing programmed instructions comprising and stored in the memory to:

transmit other pulse signals through the fixed length propagation device;

detect a start and an end of a transmission of each of the other pulse signals through the fixed length propagation device;

measure a plurality of current propagation times of each of the other pulse signals based on the detected start and end of the transmission of each of the other pulse signals through the fixed length propagation device with a time base provided by the oscillator device;

determine a difference between the reference propagation time and each of the plurality of the current propagation times;

determine when a rate of change of the determined differences between the reference propagation time and each of the plurality of the current propagation times is above a stored rate of change threshold; and output an indication of an error in the oscillator device in a free running mode when the rate of change of the determined differences is determined to be above the stored rate of change threshold.

* * * * *